United States Patent
Xin et al.

(10) Patent No.: US 7,217,152 B1
(45) Date of Patent: May 15, 2007

(54) PATCH PANEL WITH TRACER

(75) Inventors: Xin Xin, Liberty Lake, WA (US); Richard G. Garrett, Greenacres, WA (US)

(73) Assignee: Telect Inc., Liberty Lake, WA (US)

( * ) Notice: Subject to any disclaimer, the term of this patent is extended or adjusted under 35 U.S.C. 154(b) by 0 days.

(21) Appl. No.: 11/305,986

(22) Filed: Dec. 19, 2005

(51) Int. Cl.
*H01R 3/00* (2006.01)

(52) U.S. Cl. .................... 439/490; 439/540.1

(58) Field of Classification Search ........... 439/490, 439/540.1; 379/320, 326
See application file for complete search history.

(56) References Cited

U.S. PATENT DOCUMENTS

| | | | |
|---|---|---|---|
| 4,626,633 A * | 12/1986 | Ruehl et al. ............ 379/27.08 |
| 5,847,557 A | 12/1998 | Fincher et al. |
| 6,285,293 B1 * | 9/2001 | German et al. ............ 340/687 |
| 6,350,148 B1 * | 2/2002 | Bartolutti et al. ........... 439/489 |
| 6,424,710 B1 * | 7/2002 | Bartolutti et al. ........... 379/326 |
| 6,499,861 B1 * | 12/2002 | German et al. ............. 362/253 |
| 6,750,643 B2 * | 6/2004 | Hwang et al. ................ 324/66 |
| 6,900,629 B2 * | 5/2005 | Hwang et al. ........... 324/158.1 |
| 2006/0094291 A1 * | 5/2006 | Caveney et al. ......... 439/540.1 |

* cited by examiner

*Primary Examiner*—Hae Moon Hyeon
(74) *Attorney, Agent, or Firm*—Lee & Hayes, PLLC

(57) ABSTRACT

Embodiments of a patch panel with tracer are presented herein. In an implementation, an apparatus includes one or more jacks, each being associable with a cable having signal conductors. At least one of the signal conductors is configured to communicate a signal between a respective one of the jacks and an endpoint of the at least one of the signal conductors. The apparatus also includes one or more tracer lights, each being positioned adjacent to a corresponding one of the jacks. The apparatus further includes one or more switches, each being operably associated with a corresponding one of the jacks and selectable to cause another tracer light at the endpoint to illuminate while the at least one of the signal conductors is communicating signals between the respective jack and the endpoint by using one or more of the signal conductors of the cable.

27 Claims, 7 Drawing Sheets

700 

702
Select a Switch disposed on a Surface having One or More Jacks and One or More Tracer Lights, in which, Each of the Jacks is Associable with One or More Signal Conductors, at least one of which is Configured to Communicate a Signal between a Respective Jack and an Endpoint

704
In Response to the Selection, Illuminate Another Tracer Light at the Endpoint and a Corresponding One of the Tracer Lights on the Surface

*Fig. 7*

PATCH PANEL WITH TRACER

FIELD OF THE INVENTION

The present disclosure relates to telecommunication infrastructures, and more particularly to a patch panel with tracer.

BACKGROUND

Telecommunication infrastructures are provided in a variety of ways to enable users to transmit signals (e.g., voice and/or data) using a vast array of devices. For example, telephones, computers, and so on may be connected over networks provided by the infrastructures such that the devices may communicate, one with another, through the use of signals communicated via the infrastructure. However, because of the vast number of devices utilized to communicate, an equally and even greater number of connections may be utilized in typical settings to provide communication between the devices, such as through the use of signal conductors, e.g., optical fiber and/or copper cable. Therefore, routing and organization of these signal conductors when configuring and rearranging the infrastructure may be difficult.

For example, a patch panel may be utilized in the infrastructure to allow circuit arrangement and rearrangement by plugging and unplugging patch cables from jacks disposed on the "front" of the patch panel. Previously, in order to note which signal conductor connected to the back of the patch panel (and its respective destination) corresponded to which jack that was provided on the front of the patch panel, a technician manually made a notation on the front of the panel or on a separate sheet as to where the signal conductors were "run" (e.g., "office one").

In order to identify the signal conductors when configuring the patch panel and to re-identify the signal conductors should these identification become lost, changed, and so on, one previous technique required the technician to apply a test voltage at a destination of the signal conductor. Then, at the site of the patch panel (which may be located at a significant distance from the destination), the technician located a corresponding jack through use of a plug that was sequentially inserted into each of the jacks until a jack having the test voltage was located. As should be readily apparent, this may be both time consuming and frustrating to the technician, especially as the number of signal conductors and distance between locations increased.

One previous technique utilized to address these limitations involved the use of a test circuit that allowed a test voltage to be applied to the circuit when in a specific position. However, the test circuit required a specific position of a switch during testing that disabled the circuit from communicating signals during signal conductor identification. Further, when the switch was configured to communicate signals using the circuit in another position, the circuit could not be utilized in signal conductor identification. Therefore, a technician was forced to interrupt signal communication to identify the circuits, which again may be frustrating to not only the technician but also users of the circuit as well.

SUMMARY

Tracer lights are described, which may be utilized to trace connections between points, such as patch panels, wall plates, and so on. For example, a patch panel may be configured to include a jack, a tracer light and a switch disposed proximally to the jack and the tracer light. The switch is selectable to cause the tracer light on a corresponding panel, as well as a tracer light on the panel, to illuminate, thereby identifying the corresponding jacks.

BRIEF DESCRIPTION OF THE DRAWINGS

FIG. 7 is a flow diagram depicting a procedure in an exemplary implementation in which a switch is selected to cause illumination of a tracer light.

The same reference numbers are utilized in instances in the discussion to reference like structures and components.

DETAILED DESCRIPTION

It should be noted that the following devices are examples and may be further modified, combined and separated without departing from the spirit and scope thereof.

Figure 1:
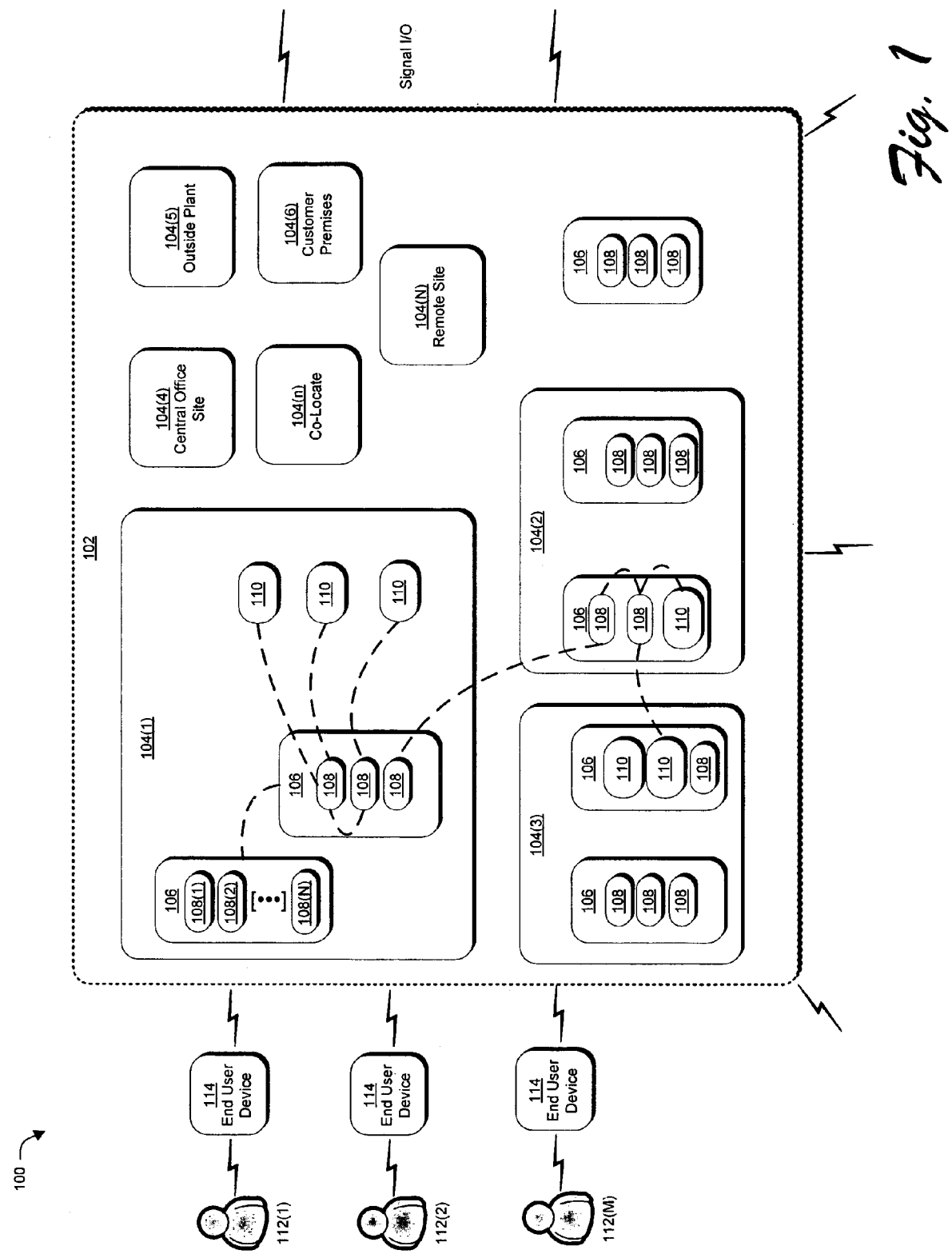
FIG. 1 is an illustration of an environment having a portion of a telecommunications infrastructure that includes a plurality of patch panels.

FIG. 1 illustrates an exemplary implementation of an environment 100 operable to provide a telecommunication network in which the apparatuses and procedures of the present disclosure may be employed. The environment 100 includes at least a portion of a telecommunication network infrastructure 102 hereinafter "infrastructure"). Infrastructure 102 provides telecommunications processes, structures, equipment and devices between end-user devices such as modems, phones, and so on used by end-users outside of the infrastructure 102 to communicate via a telecommunications network. Within infrastructure 102 a variety of equipment, apparatus and devices are utilized in routing, processing, and distributing signals. Telecommunications signals and data may among other actions be processed, switched, routed, tested, patched, managed, or distributed by various equipment in the infrastructure 102.

A variety of sites 104(1)–104(N) within infrastructure 102 may maintain various equipment used in the infrastructure 102. As depicted in FIG. 1, infrastructure 102 may have numerous sites 104 which may be different physical locations within infrastructure 102 such as a central office, an outside plant site, a co-locate site, a remote site, or customer premises. Sites 104 may be locations within infrastructure 100 which hold a variety of structures and equipment to facilitate processing and distributing of telecommunications signals. The equipment may be centralized in one site (e.g., site 104(1)) or dispersed throughout different sites 104 in infrastructure 102. In other words, interconnections may be made between various sites 104 in infrastructure 102, for example the connection denoted in FIG. 1 by a dashed line between site 104(1) and 104(2). Naturally, numerous interconnections between a plurality of sites 104 typically may be made.

Each site 104 may have one or more housings 106 having a plurality of components 108. A housing refers to a structure to maintain or hold a plurality of components 108 in infrastructure 102 and may be configured in a variety of ways. For example, the housing 106 may be configured as a housing for a cabinet, a terminal block, a panel, a chassis, a digital cross-connect, a switch, a hub, a rack, a frame, a bay, a module, an enclosure, an aisle, or other structure for receiving and holding a plurality of components 108. Hereinafter, the terms housing and cabinet will be used for convenience to refer to the variety of structures in infrastructure 102 that may hold components 108. Housings 106 may be inside a building or housings may themselves be configured to be placed outside. Housings 106 may typically be configured to protect components 108 from environmental influences. The environment 100 of FIG. 1, for instance, depicts site 104(1) as having two housings (e.g. cabinets) 106, each having a plurality of components 108. Other housings 106 may be included throughout infrastructure 102 at sites 104, for example housings 106 depicted within site 104(2).

Components 108 are pieces of telecommunications equipment in infrastructure 102 that may be kept or maintained in a housing 106 (e.g. cabinet) within the infrastructure 102. Components for example may be cross-connect panels, modules, terminal blocks, chassis, backplanes, switches, digital radios, repeaters, patch panels and so forth. Generally, components 108 may be those devices utilized for processing and distributing signals in infrastructure 102 and which may be maintained in a housing 104. Components 108 may also be used to manage cabling in infrastructure 102. Therefore, components 108 may terminate, interconnect or cross-connect a plurality of network elements 110 within infrastructure 102.

Components 108 may be utilized to distribute telecommunications signals sent to and from infrastructure 102 by one or more end-users 112 using an end-user device 114. The interconnections between telecommunications equipment (e.g., cabinets 106, components 108 and network elements 110) provide signal pathways for telecommunications signals. Interconnection may be via one or more components 108 such as by connectors on a patch panel or may be internal to the components 108 such as via cabling within a component 108. Representative interconnections are shown by dashed lines in FIG. 1 and numerous interconnections within and between telecommunication equipment are typical.

Network elements 110 may be implemented in a variety of ways. For example, network elements 110 may be configured as switches, digital cross connect system (DCS), telecommunication panels, digital radios, fiber optic equipment, network office terminating equipment, and any other telecommunication equipment or devices employed in a telecommunications infrastructure 102. It is noted that one or more of the components 108 within a housing 106 may also be a network element 110. In other words, network elements 110 may be found within a housing 106 as component 108 of the housing 106. Thus, in a particular housing 106 interconnections may be between network elements 110 externally (e.g., not in the same cabinet) or internally (e.g., within the same cabinet). Naturally, internal and external interconnections may be mixed such that a single housing 106 will have both internal and external interconnections. Further, such connections for a particular housing 106 might be made wholly within a particular site 104. Interconnections may also be made between a plurality of sites 104.

The environment 100 depicts a plurality of end users 112(1)–112(M) which may be communicatively coupled, one to another, via a telecommunication network including infrastructure 102. End users 112 may be implemented in a wide variety of ways, such as consumers, business users, internal users in a private network, and other types of users that use telecommunications signals or transmit and receive telecommunications signals. Additionally, for purposes of the following discussion clients 112(1)–112(M) may also refer to client devices and software which are operable to transmit and receive telecommunications signals. Thus, clients 112(1)–112(M) may be implemented as users, software and devices.

The interconnection of pieces of equipment (e.g. cabinets 106, components 108 and network elements 110, and so forth) provides signal pathways between equipment for signals input to and output from infrastructure 102. For example, end-users 112(1)–112(M) may send signals into the infrastructure 102 and receive signals output from the infrastructure 102 using a variety of end user devices 114. For example, end user 112(2) may communicate with end user 112(M) via end-user device 114 (e.g., a telephone). Thus, signals sent to and from infrastructure 102 by end-users 112 via an end user device 114, may be routed directed, processed, and distributed in a variety of ways via the equipment and interconnections within infrastructure 102.

In an implementation, one or more cabinets 106 may be configured as a distribution frame such as a main distribution frame (MDF) or intermediate distribution frame (IDF). A distribution frame has a plurality of components 108. Typically, components 108 in a distribution frame distribute telecommunications signals between network elements 110 within infrastructure 102 and between end-users 112. A distribution frame may be a switching unit, for example in a telephone system, which provides service to end-users 112 and having equipment for terminating and interconnecting end-user lines (e.g. subscribers). The distribution frame is used to connect end-users lines, one to another, or to connect end user lines through network elements 110 in infrastructure 102. The distribution frame in a site 104 may also hold protective devices and act as a test point between end-users 112 and equipment in infrastructure 102.

In an implementation, a housing 106 configured as a distribution frame has a plurality of components 108. The housing 106 (e.g., a distribution frame), for instance, may have a plurality of components 108 configured as patch panels, which is depicted in FIG. 1 by patch panels 108(1), 108(2), . . . , 108(N), to provide connections between a variety of network elements 110. The connections using the patch panels 108(1)–108(N) may be accomplished through the use of signal conductors, e.g., "cable". It should be apparent that a variety of different types of signal conductors may be utilized to provide the communicative connections, such as optical fiber, copper, and so on.

Patch panels 108(1)–108(N), as previously described, may be utilized in the infrastructure 102 to allow circuit arrangement and rearrangement by plugging and unplugging patch cables between jacks in the patch panel and/or a different patch panel. For instance, a patch panel 106 in a housing 106 may be utilized to connect network element 110 located in the same housing 106, between network elements 110 located in different housings 106, with network elements 110 located at different sites 104(1)–104(N), and so on.

As should be apparent from the environment 100, a great number of connections may be made between components 108 using signal conductors. To identify which connection is provided by each of the connections (i.e., the signal conductor), the patch panels 108(1)–108(N) may employ tracer functionality, further discussion of which may be found in relation to the following figure.

Figure 2:
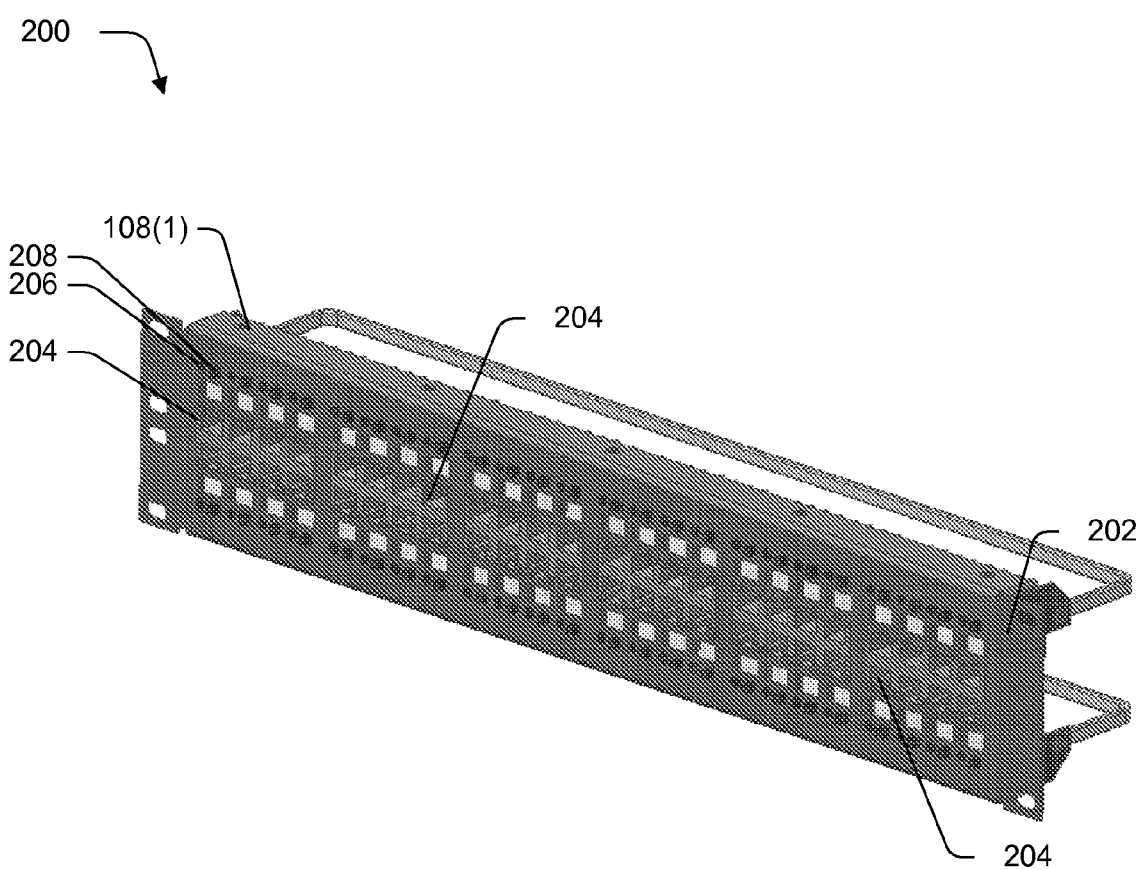
FIG. 2 is an illustration of an exemplary implementation of one or more of the patch panels of FIG. 1.

FIG. 2 illustrates an exemplary implementation 200 of one or more of the patch panels 108(1)–108(N) of FIG. 1. The patch panel 108(1) in this instance is configured to mount within a housing 106 of FIG. 1 and includes a surface 202 that is accessible when mounted in the housing 106. The surface 202 includes a plurality of jacks 204 that are configured to receive patch cables (e.g., a Registered Jack-45 (RJ-45) cable) such that a technician may reroute and cross connect signal conductors that is communicatively coupled to the respective jacks 204 in the "back" (opposing side of the surface 202) of the patch panel 108(1). Thus, each of the jacks 204 may have one or more respective signal conductors that are communicatively coupled to other components or network elements, such as another patch panel as illustrated in FIG. 3.

Each of the jacks 204 includes a respective tracer light 206 and a switch 208 which are also disposed on the surface 202 of the patch panel 108(1). The tracer lights 206 and the switches 208 are operable to enable a technician to trace signal conductors communicatively coupled to the jacks, further discussion of which may be found in relation to FIG. 3.

The patch panel 108(1) in this instance is illustrated as having a compact form factor for rack mounting that is provided by forming the plurality of jacks into rows. The tracer lights 206 and the switches 208 are also arranged into rows such that the rows of jacks 204 are positioned between the rows of switches 208 and tracer lights 206. In the illustrated instance, a one and three quarters inch height is provided for rack mounting the patch panel 108(1) that includes 48 jacks and the proximally associated tracer lights and switches, although a wide variety of other instances are also contemplated.

Figure 3:
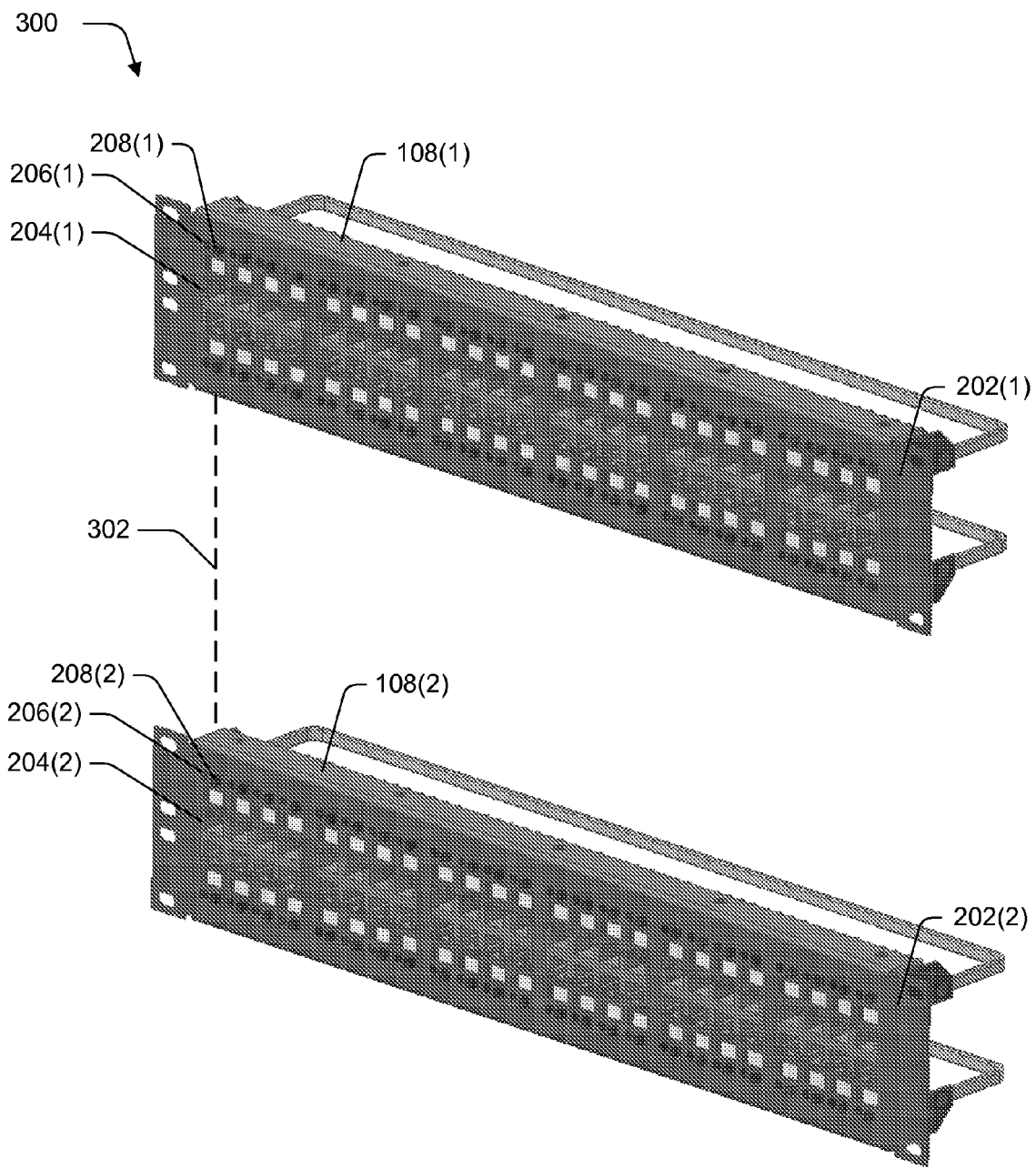
FIG. 3 is an illustration of an exemplary implementation of the patch panel of FIG. 2 as communicatively connected to another one of the patch panels of FIG. 1.

FIG. 3 illustrates an exemplary implementation 300 of the patch panel 108(1) of FIG. 2 as communicatively connected to another one of the patch panels 108(2) of FIG. 1. In the discussion of FIG. 3, reference numbers with parentheticals will be utilized to denote respective patch panels and elements of the patch panels, e.g., patch panel 108(1), surface 202(1), jack 204(1), tracer light 206(1), and switch 208(1) versus patch panel 108(2), surface 202(2), jack 204(2), tracer light 206(2), and switch 208(2).

Jack 204(1) is communicatively coupled to jack 204(2) via one or more signal conductors 302. The jacks 204(1), 204(2) in this instance are endpoints of the signal conductor 302 and serve as a destination of signal communicated via the signal conductor 302. The jacks 204(1), 204(2) of the patch panels 108(1), 108(2) may then be utilized to patch the signal conductor to other signal conductors communicatively coupled to other jacks (e.g., on the same patch panel, different patch panel, and so on), thereby continuing a communicative pathway formed by the signal conductors. Thus, signals may be communicated between the jacks 204(1), 204(2) using the signal conductors 302 and continue on to other signal conductors and/or network elements. Additionally, although the signal conductors 302 are illustrated in an embodiment that generally uses a plurality of metal (e.g., copper) cables, the signal conductors 302 may be configured in a variety of ways, such as optical signal conductors and so on.

The switches 208(1), 208(2) on the respective patch panels 108(1), 108(2) are selectable by a technician to cause a corresponding tracer light 206(1), 206(2) on an opposing patch panel 108(1), 108(2) to illuminate. For example, a technician may press the switch 208(1) using a finger to cause a circuit to be closed (which involves the one or more signal conductors 302) with tracer light 206(2) on patch panel 108(2), thereby causing the tracer light 206(2) to illuminate. To indicate that the switch has been successfully pressed (i.e., the circuit has been closed), the tracer light 206(1) on the patch panel 108(1) may also illuminate. In this way, the technician may readily trace the signal conductor 302 to find its endpoint, e.g., jack 204(2) in this instance. Similar functionality may also be provided when pressing switch 208(2) on panel 108(2).

The communicative pathway between the switches 208 (1), 208(2) and the tracer lights 206(1), 206(2) may be provided in a variety of ways. For example, an idle pin on and signal conductor connected to an RJ-45 jack may be utilized. Thus, use of the switches 208(1), 208(2) and tracer lights 206(1), 206(2) does not interrupt signals being communicated between the respective jacks 204(1), 204(2), e.g., voice and/or data signals being communicated on other signal conductors of the signal conductor connection 302. In another example, when signal conductors utilized to communicate signals between the jacks are optical fibers, a metal signal conductor (e.g., copper) may also be included with the signal conductor 302 which connects the switches 208(1), 208(2) with the corresponding tracer lights 206(1), 206(2). In this other example, the metal signal conductor again is not utilized to communicate signals that are to be propagated "past" the jacks 204(1), 204(2), e.g., to other network elements, and thus does not interrupt signal communication that is being performed using the signal conductors 302. A wide variety of other examples are also contemplated. Additionally, although connection of patch panels 108(1), 108(2) has been described, the patch panel 108(1) may be connected to a variety of network elements, an example of which may be found in relation to FIG. 6.

Figure 4:
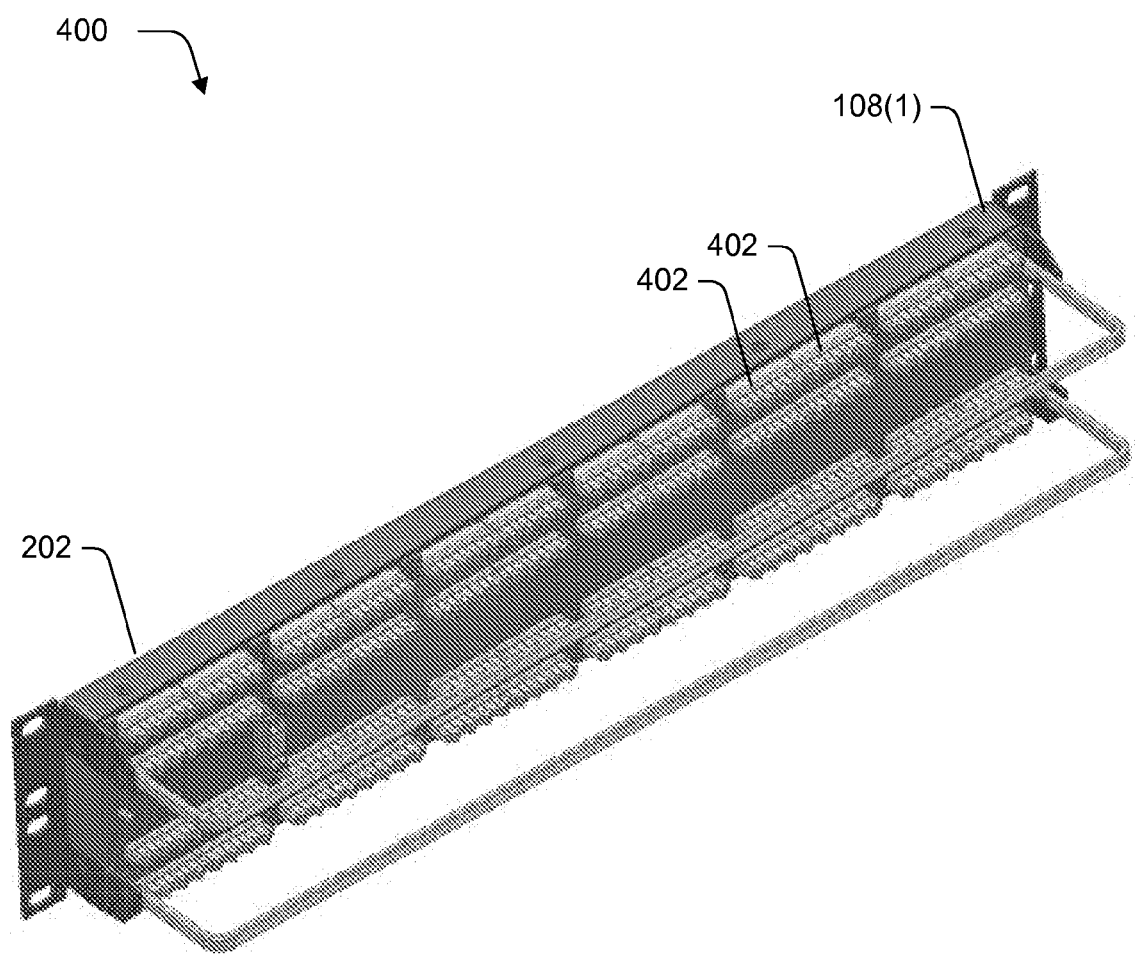
FIG. 4 is an illustration of an exemplary implementation showing a rear view of the patch panel of FIG. 2.

FIG. 4 illustrates an exemplary implementation 400 showing a rear view of the patch panel 108(1) of FIG. 2. The patch panel 108(1) in this instance is illustrated as showing a plurality of connections 402 that are disposed on an opposing side of the surface 202 of the patch panel 108(1) that contains the jacks 204. Each of the connections 402 is configured to accept signal conductors for communication of signals as previously described, which in this instance sets of signal conductors are shown to connect each jack to another respective jack as previously described in relation to FIG. 3.

Figure 5:
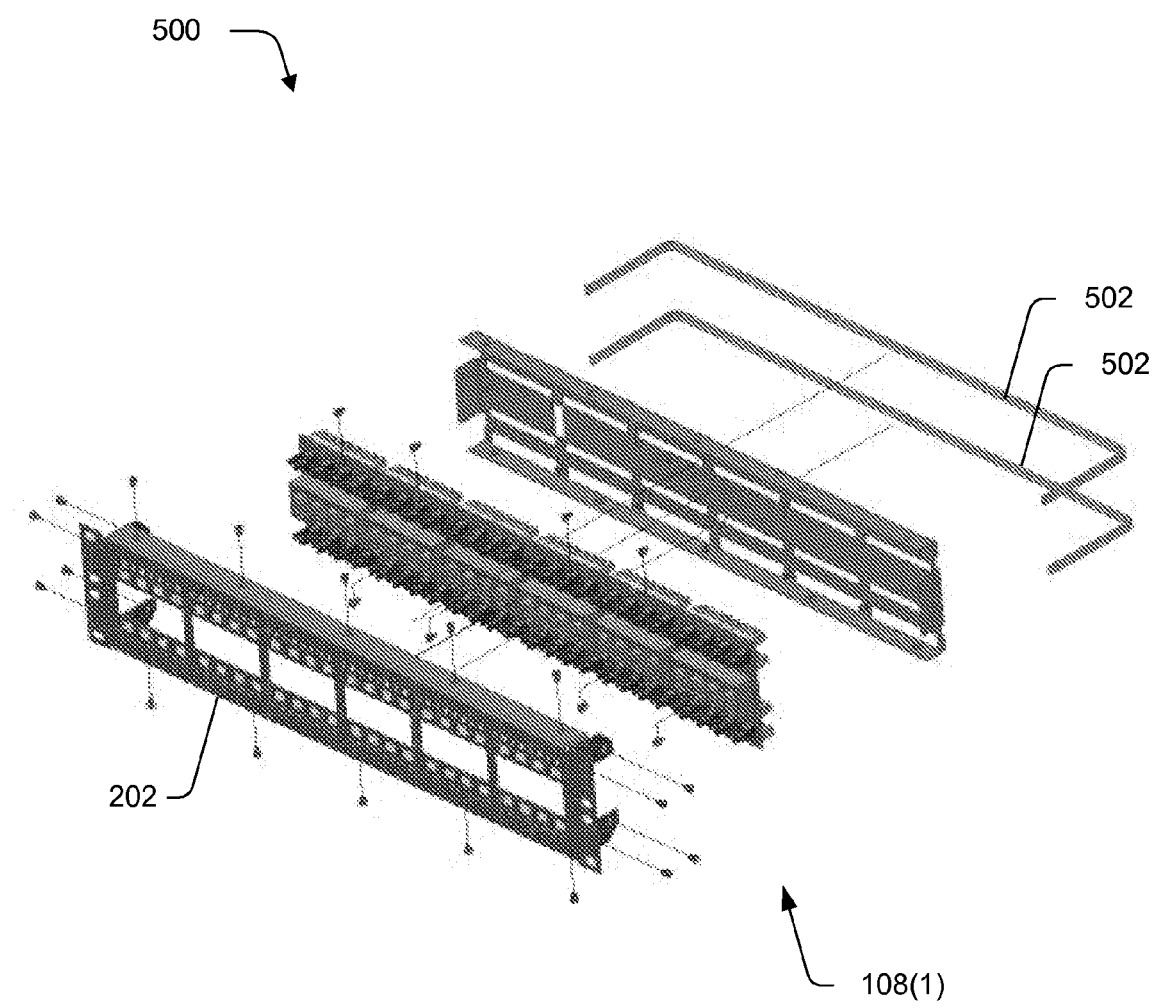
FIG. 5 is an illustration of an exemplary implementation showing an exploded view of the patch panel of FIG. 2.

FIG. 5 illustrates an exemplary implementation 500 showing an exploded view of the patch panel 108(1) of FIG. 2. The patch panel 108(1) includes a plurality of protective members 502 that are configured to protect elements of the patch panel 108(1) as well as ease mounting of the patch panel 108(1), such as to a housing 106.

The patch panel 108(1) also includes the surface 202 and a rear cover 504, between which electrically operative elements of the patch panel 108(1) are disposed for protection. For example, the tracer lights 206 and switches 208 may be positioned between the surface and the rear cover 504, with portions of the elements protruding through the surface 202 to be visible to a technician, selectable by the technician (e.g., the switches), and so on.

Figure 6:
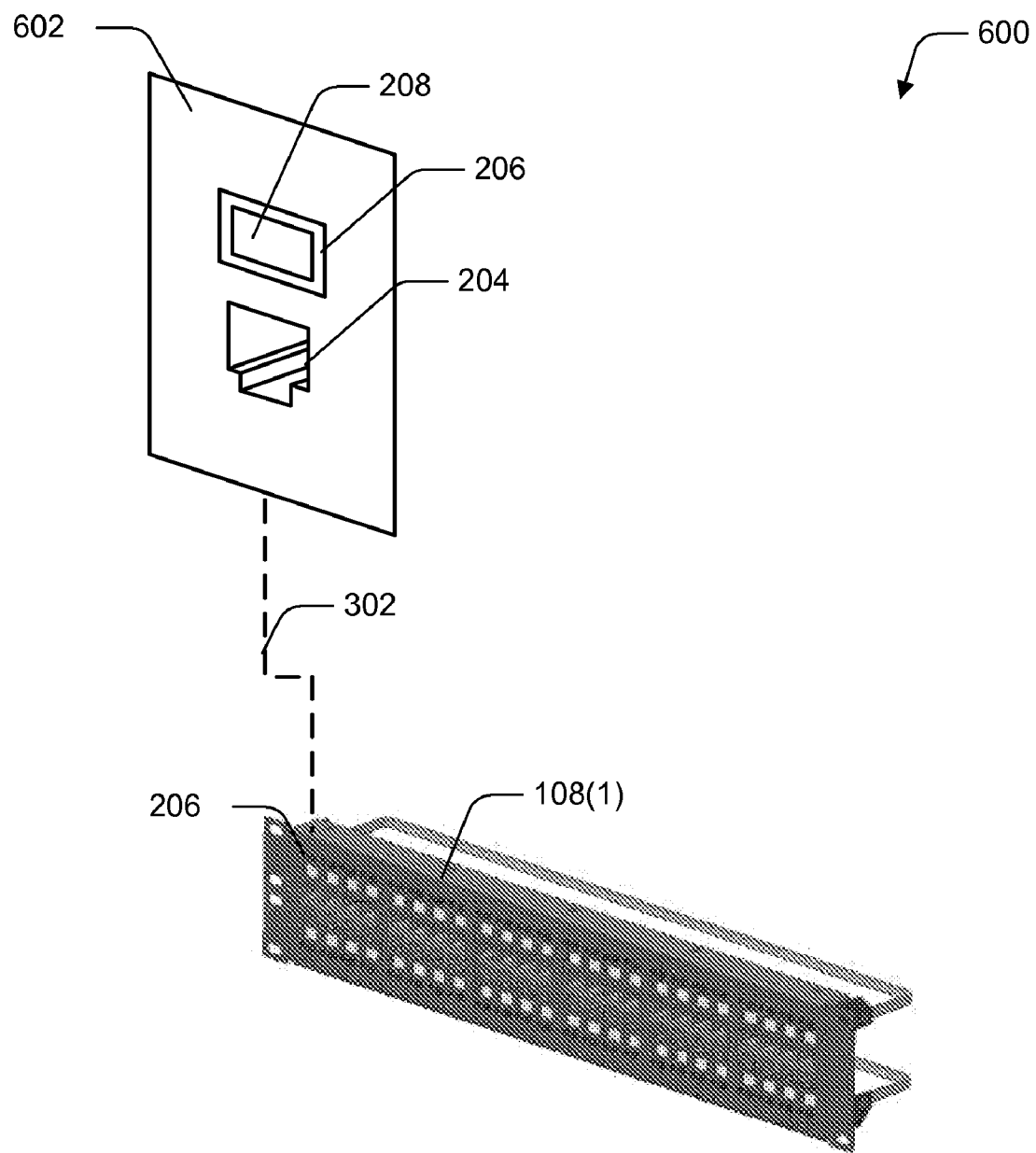
FIG. 6 is an illustration of an exemplary implementation in which the patch panel of FIG. 2 is illustrated as being communicatively coupled to a wall plate.

FIG. 6 illustration an exemplary implementation 600 in which the patch panel 108(1) of FIG. 2 is illustrated as being communicatively coupled to a wall plate 602. The wall plate 602 also includes a jack 204, tracer light 206 and switch 208. In this instance, the tracer light 206 substantially surrounds the switch 208.

When selected, the switch 208 causes a corresponding tracer light of the patch panel 108(1) to illuminate as previously described. Therefore, the wall plate 602 may be placed in a variety of locations (e.g., sites 104 of FIG. 1) and used to identify corresponding jacks 204 of the patch panel 108(1). A wide variety of other configurations are also contemplated.

Exemplary Procedures

The following discussion describes techniques that may be implemented utilizing the previously described systems and devices. The procedures are shown as a set of blocks that specify operations performed and are not necessarily limited to the orders shown for performing the operations by the respective blocks.

FIG. 7 depicts a procedure 700 in an exemplary implementation in which a switch is selected to cause illumination of a tracer light. A switch is selected that is disposed on a surface having one or more tracer lights and one or more jacks. Each of the jacks is associable with one or more signal conductors, at least one of which is configured to communicate a signal between a respective jack and an endpoint (block 702). For example, a switch 208 on the wall plate 602 of FIG. 2 may be selected by a technician by pressing the switch 208 using a finger.

In response to the selection, another tracer light at the endpoint is illuminated and a corresponding one of the tracer lights on the surface is also illuminated (block 704). Continuing with the previous example, the tracer light 206 on the patch panel 108(1) is illuminated in response to the selection of the switch 208, which indicates to the technician that the jack 204 on the patch panel 108(1) corresponds to the wall plate 602. Also, the tracer light 206 on the wall plate 602 itself is also illuminated, thereby indicating to a technician that pressed the switch 208 that the switch has been successfully initiated. A variety of other examples are also contemplated.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. An apparatus comprising:
   one or more jacks, each being configured to be connected in signal communication with another jack located at an endpoint by way of one or more signal conductors;
   one or more tracer lights, each being positioned adjacent to a corresponding said jack; and
   one or more switches, wherein each said switch is configured to be:
   operably associated with a corresponding said jack; and
   user selectable to cause another tracer light located at the endpoint to illuminate by way of the one or more signal conductors while signals are communicated between the respective jack and the other jack located at the endpoint; and
   wherein user selection of the respective switch causes the other tracer light located at the endpoint to illuminate without requiring additional logic or data communication.

2. An apparatus as described in claim 1, wherein the one or more jacks, the one or more tracer lights and the one or more switches are disposed on a surface of a patch panel.

3. An apparatus as described in claim 1, wherein the other tracer light at the endpoint and the switch are respectively configured to be directly communicatively coupled via a corresponding one or more of the signal conductors.

4. An apparatus as described in claim 1, wherein the one or more jacks are configured as a Registered Jack-45 (RJ-45).

5. An apparatus as described in claim 1, wherein each said switch is selectable by a user's finger.

6. An apparatus as described in claim 1, wherein the one or more jacks are arranged into first and second rows that are disposed between first and second rows of the one or more tracer lights.

7. An apparatus as described in claim 1, wherein at least one of the one or more signal conductors is an optical fiber.

8. An apparatus as described in claim 7, wherein at least one of the one or more signal conductors is a metal signal conductor.

9. An apparatus as described in claim 1, wherein the one or more tracer lights are light emitting diodes (LEDs).

10. An apparatus as described in claim 1, wherein the endpoint is configured as part of a patch panel or as a wallplate.

11. An apparatus as described in claim 1, wherein the one or more jacks, the one or more switches, and the one or more tracer lights are incorporated on a surface of a wallplate.

12. An apparatus as described in claim 1, wherein the one or more jacks, the one or more switches, and the one or more tracer lights form a patch panel.

13. A patch panel comprising:
    a plurality of jacks disposed on a surface, wherein:
    each said jack is configured to be connected in signal communication with an endpoint location by way of one or more signal conductors; and
    a plurality of tracer lights disposed on the surface, wherein each said tracer light is positioned adjacent to a corresponding said jack; and
    a plurality of switches disposed on the surface, wherein each said switch is configured to be:
    operably associated with a corresponding said jack; and
    selectable to cause another tracer light at the endpoint location to illuminate by way of the one or more signal conductors and without additional logic or data communication.

14. A patch panel as recited in claim 13, wherein each said switch is selectable to cause the other tracer light at the endpoint location to illuminate while the one or more signal conductors are communicating signals between the respective said jack and the endpoint location.

15. A patch panel as recited in claim 13, wherein each said switch is selectable through use of a finger by the user.

16. A patch panel as recited in claim 13, wherein each said switch is selectable to also cause a respective said tracer light to illuminate that is positioned on the surface adjacent to a respective said switch.

17. A patch panel as recited in claim 13 wherein the plurality of jacks are configured as Registered Jack-45 (RJ-45).

18. A system comprising:
    a device having a jack and a tracer light; and
    a patch panel that includes:
    a plurality of jacks, at least one of which is communicatively coupled to the device by way of one or more signal conductors;

a plurality of tracer lights, wherein each said tracer light is positioned adjacent to a corresponding said jack; and a plurality of switches, wherein at least one said switch is selectable to cause the tracer light of the device to illuminate without requiring additional logic or data communication and while signals are communicated between the at least one said jack of the patch panel and the jack of the device.

19. A system as described in claim 18, wherein the tracer light of the device and the at least one said switch are directly communicatively coupled via one or more of the signal conductors.

20. A system as described in claim 18, wherein each said jack is configured as a Registered Jack-45 (RJ-45).

21. A system as described in claim 18, wherein each said switch is selectable by a user's finger.

22. A system as described in claim 18, wherein the plurality of jacks of the patch panel is arranged into first and second rows that are disposed between first and second rows of the plurality of tracer lights.

23. A system as described in claim 18, wherein at least one of the one or more signal conductors is an optical fiber.

24. A method comprising:
selecting a switch disposed on a surface having:
one or more jacks, each being connectable with another jack at a corresponding endpoint location; and
one or more tracer lights, each being positioned adjacent to a corresponding said jack; and in response to the selecting, illuminating another tracer light at the corresponding endpoint location and a corresponding said tracer light on the surface, wherein the other tracer light is configured to be illuminated without requiring additional logic or data communication and while other signals are being communicated between the jack corresponding to the selected switch and the jack at the corresponding endpoint location.

25. A method as described in claim 24, wherein the tracer light of the device and the at least one said switch are directly communicatively coupled via one or more signal conductors.

26. A method as described in claim 24, wherein the surface is configured as part of a patch panel.

27. A method as described in claim 24, wherein the surface is configured as a wall plate.

* * * * *